United States Patent

Doering et al.

[15] 3,683,034
[45] Aug. 8, 1972

[54] PROCESS FOR THE PREPARATION OF SUBSTITUTED HYDROQUINONES

[72] Inventors: William Von E. Doering, Cambridge, Mass.; William J. Farrissey, Jr., Northford, Conn.; Floro F. Frulla, Wallingford, Conn.; Durvasula V. Rao, Hamden, Conn.

[73] Assignee: The Upjohn Company, Kalamazoo, Mich.

[22] Filed: April 16, 1970

[21] Appl. No.: 29,279

[52] U.S. Cl............260/620, 260/613 D, 260/621 A, 260/621 H
[51] Int. Cl.......................C07c 39/12, C07c 39/02
[58] Field of Search............260/620 R, 621 H, 613 D

[56] References Cited

UNITED STATES PATENTS 3,395,160   7/1968   McLean................260/621 H

OTHER PUBLICATIONS

Matsumura et al., J.A.C.S. 53, pp. 1,406– 1,408, 1931

Primary Examiner—Howard T. Mars
Attorney—Denis A. Firth and John Kekich

[57] ABSTRACT

A novel process is disclosed for preparing substituted hydroquinone of the formula:

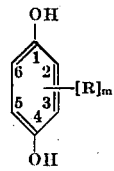

wherein R is member selected from the group consisting of lower-alkyl, aryl, and lower alkoxy and $m$ is an integer of 1 to 4; by reductive hydrolysis of the corresponding nitrosophenol.

7 Claims, No Drawings

PROCESS FOR THE PREPARATION OF SUBSTITUTED HYDROQUINONES

BACKGROUND OF THE INVENTION

1. Field of the Invention

This invention relates to a novel process for preparing substituted hydroquinones from corresponding nitrosophenols. More particularly, this invention relates to a one-step reductive hydrolysis of a substituted nitrosophenol to the corresponding hydroquinone.

2. Description of the Prior Art

The growing importance of certain substituted hydroquinones to the photographic industry has led to the development of a variety of methods for their preparation. The method disclosed in U.S. Pat. No. 3,395,160 (McLean) begins with a substituted p-nitrosophenol which is heated at a temperature between 150° to 200° C with a carbonyl compound in acid media, to yield the corresponding p-benzoquinone. In a second step, the substituted p-benzoquinone is reduced by employing a reducing agent or by catalytic hydrogenation to yield the substituted hydroquinone.

We have found that hydroquinone can be prepared directly from the corresponding p-nitrosophenol in a one-step process of reductive hydrolysis employing a catalytic hydrogenation technique. By our method disclosed herein, high yields of substituted hydroquinones are obtained which are easily separated from the reaction mixture using relatively inexpensive standard techniques. The overall advantage in our method is a more economical procedure.

SUMMARY OF THE INVENTION

This invention comprises a process for preparing a substituted hydroquinone of the formula:

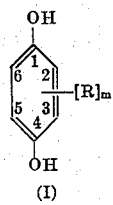

(I)

wherein R is a member selected from the group consisting of lower-alkyl, aryl and lower-alkoxy and m is an integer of 1 to 4; which process comprises heating the corresponding p-nitrosophenol to a temperature of about 60° to 120° C in an aqueous acidic medium, and in the presence of hydrogen and a hydrogenation catalyst.

The term "lower-alkyl" as used means alkyl of from one to six carbon atoms such as methyl, ethyl, propyl, butyl, pentyl, hexyl and the like, including isomeric forms thereof.

The term "aryl" as used herein means the monovalent moiety obtained by removal of a hydrogen atom from an aromatic hydrocarbon of from six to 12 carbon atoms, inclusive. Illustrations of aryl are phenyl, naphthyl, tolyl, xylyl, diphenylyl, and the like.

The term "lower-alkoxy" as used herein means alkoxy from one to six carbon atoms, inclusive, such as methoxy, ethoxy, propoxy, butoxy, pentyloxy, hexyloxy and the like, including isomeric forms thereof.

The compounds produced by the process of the invention, for the most part, are well known and find usefulness as photographic developers intermediates for photographic developers and vitamins, antioxidants, and polymerization inhibitors (Kirk - Othmer, Encyclopedia of Chemical Technology, 2nd Edition, Vol. 11, pp. 489)

DETAILED DESCRIPTION OF THE INVENTION

Nitrosophenols used in this process are phenolic compounds wherein a nitroso radical is bonded to a carbon atom in the benzene ring containing the phenolic hydroxyl group in the para position. Theoretically, nitrosophenols exist as an equilibrium mixture of a nitrosophenol and an oxime as illustrated by the schematic formula:

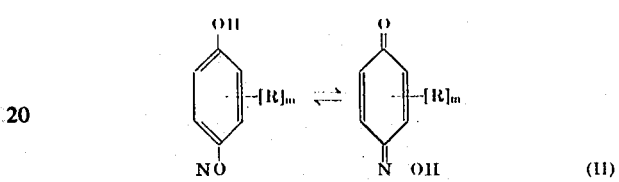

(II)

wherein R and m have the significance hereinbefore attributed them. This invention is independent of the state or equilibrium in which the particular nitrosophenol might exist and it is to be understood that the term "nitrosophenol" employed herein is inclusive of the various forms in which said compounds can exist.

The nitrosophenols used to prepare compounds of the invention are represented by the general formula:

(III)

wherein R and m are as before defined. For the most part, compounds of the formula (III) are well known, as is their preparation. Generally, the method of preparation is by nitrosation of the corresponding alkyl, aryl or alkoxy substituted phenol with sodium nitrite in a weak acid solution. More particularly, for example, Vaughan et al. in J. Org. Chem. Vol. 21,pp. 10 describes methods of preparation for alkyl substituted nitrosophenols. B.G.B. Scholten, in Ann. 312, p. 211 (1900) and Borsche et al., Ber 50, p. 596 (1917) describe the preparation of phenyl substituted nitrosophenol Illustrative of compounds of the formula (III) are, for example, 3,5-dimethyl-4-nitrosophenol; 2,6-di-tert-butyl-4-nitrosophenol; 2,6-dimethyl-4-nitrosophenol; 2,3,6-trimethyl-4-nitrosophenol; 2-methyl-4-nitrosophenol; 3,5-dimethyl-6-ethyl-4-nitrosophenol; 3,5-dimethyl-2,6-diethyl-4-nitrosophenol; 2,5-di-tert-amyl-4-nitrosophenol; 2,5-diethoxy-4-nitrosophenol; 3,5-dimethoxy-4-nitrosophenol; 2-phenyl-4-nitrosophenol; and 2-phenyl-5-methyl-4-nitrosophenol, all of which are well known.

The process of the invention is carried out by heating the appropriate compound of formula (III) with a hydrogenation catalyst in an aqueous acidic medium and in the presence of hydrogen. Preferably, the concentration of compounds of the formula (III) does not exceed about 100 gms/liter acid media.

The catalyst employed is any conventional catalyst usually used to catalyze the hydrogenation of an organic compound, and is limited only in that it must itself be stable in acid medium. Examples of such catalysts are the noble metals, preferably platinum and palladium. Particularly preferred catalysts are supported catalysts such as platinum-on-carbon, palladium-on-barium sulfate, palladium-on-charcoal and the like. The most preferred catalyst is platinum-on-carbon. The preferred concentration of catalyst is about 1 percent to about 5 percent by weight of compounds of the formula (III) employed in the reaction mixture.

The aqueous acidic medium used is the aqueous solution of a mineral acid, such as sulfuric acid, phosphoric acid, hydrochloric acid, and the like. Preferably sulfuric acid is used. The concentration of acid can be from 0.1 N to about 6 N and is preferably from 0.5 N to 3 N. The temperature range of heating the nitrosophenol in acid mixture is about 60° C to about 120° C, preferably from about 80° C to about 100° C.

The reaction mixture is agitated vigorously during heating in a hydrogen gas environment. Conventional agitation techniques and apparatus can be employed. Solvents such as ethyl acetate, butyl acetate, toluene, dibutyl ether, cyclohexanone and the like can be added to the aqueous reaction mixture, if desired, to assist in solubilizing the nitrosophenol. The reaction proceeds under hydrogen pressures of from 1 atmosphere to 50 psi using conventional hydrogenation apparatus and techniques of hydrolysis, and is complete in about 1 to 5 hours. Generally, lower concentrations of catalyst are satisfactory when higher hydrogen pressures are employed. Completion of the reaction can be detected by standard analytical techniques such as those employing vapor phase chromatography, gel permeation chromatography, infrared and ultraviolet analytical techniques.

The final hydroquinone product is easily separated from the reaction mixture using conventional techniques and apparatus. For example, a convenient separation can be performed by filtering the reaction mixture to remove solids, and extracting the filtrate with such readily available solvents as diethyl ether, ethyl acetate, and the like. Washed, dried and evaporated, the extract yields the substituted hydroquinone which can be further purified, if desired, by recrystallization from hot water, ether, ethyl acetate, ethyl alcohol and the like.

The following examples describe the manner and process of making and using the invention and set forth the best mode contemplated by the inventor of carrying out the invention but are not to be construed as limiting.

EXAMPLE 1

To a Parr low pressure catalytic apparatus, shaker type (series No. 3910$^{(1.)}$ is charged 1.0410 gms. (6.88 millimoles) of 2,6-dimethyl-4-nitrosophenol, 15.9 mg. of 1 percent platinum-on-carbon (Baker Chem. Corp. Phillipsburg, New Jersey) and 250 cc 1 N sulphuric acid.

The reactor vessel is purged with hydrogen gas and charged additionally with hydrogen gas at 15 psi. The mixture is heated between 90° and 95° C for about 5 hours during which time it is vigorously agitated. Thereafter it is cooled and the mixture filtered to remove catalyst and residue. The filtrate is extracted 3 times with 200 ml. portions of ether, and the combined extracts are washed with a solution of saturated sodium chloride, dried over anhydrous magnesium sulfate and heated to evaporate ether solvent. The residue is 0.92 gms. of light tan solid material identified by vapor phase chromatography as 95.5 percent of 2,6-dimethylhydroquinone (92.5 percent theory). Recrystallization from benzene-petroleum ether (30° to 75° C) yields light tan crystalline needles of 2,6-dimethylhydroquinone with melting point 147.5° to 149.5° C. In the same manner, but substituting 5 percent palladium-on-barium sulfate for the 1 percent platinum-on-carbon, 2,6-dimethylhydroquinone is obtained in comparable yield.

EXAMPLE 2

To the Parr low pressure catalytic apparatus of Example 1 is charged 5.1833 gms. (34.3 millimoles) of 2,6-dimethyl-4-nitrosophenol, 74.4 mg. of 1 percent platinum-on-carbon catalyst and 250 cc of 1 N sulfuric acid. The reactor vessel is purged with hydrogen gas and charged additionally with hydrogen gas at 15 psi. The mixture is heated circa 100° C for about 5 hours while vigorously agitated. Thereafter, the mixture is cooled and filtered to remove catalyst and residue. The filtrate is extracted 3 times with 200 ml. portions of ether and the combined extracts are washed with a solution of saturated sodium chloride, dried over anhydrous magnesium sulfate and heated to evaporate ether solvent. The residue is 4.15 gms. of light tan crystalline needles (theory 4.74 gms.) identified by vapor phase chromatography as 67.1 percent of 2,6-dimethylhydroquinone (57 percent theory).

Using the same procedure, but substituting:
2,6-di-tert-butyl-4-nitrosophenol; 3,5-dimethyl-6-ethyl-4-nitrosophenol;
3,5-dimethyl-2,6-diethyl-4-nitrosophenol; 2,5-di-tert-amyl-4-nitrosophenol;
2,5-diethoxy-4-nitrosophenol; 3,5-dimethoxy-4-nitrosophenol; and
2-phenyl-5-methyl-4-nitrosophenol respectively for the 2,6-dimethyl-4nitrosophenol, there are obtained:
2,6-di-tert-butyl-hydroquinone;
3,5-dimethyl-6-ethyl-hydroquinone;
3,5-dimethyl-2,6-diethyl-hydroquinone;
2,5-di-tert-amyl-hydroquinone;
2,5-diethoxyhydroquinone;
3,5-dimethoxyhydroquinone; and
2-phenyl-5-methylhydroquinone; respectively.

EXAMPLE 3

To the low pressure Parr apparatus of Example 1, is charged 5.0 gms. (0.033 mole) of 3,5-dimethyl-4-nitrosophenol and 0.15 gms of 1 percent platinum-on-carbon with 25 ml. of 1.5 N sulfuric acid and 125 ml toluene. The reactor vessel is purged with hydrogen gas and additionally charged with hydrogen gas at 20 psi. The mixture is heated quickly to about 70° C (8 minutes) and the hydrogenation is commenced. The temperature is then adjusted to about 83° C. After 3½ hours the reactor vessel is charged with an additional 0.1 gm of 1 percent platinum-on-carbon and 25 ml of water and repressurized with hydrogen gas at 20 psi. After an additional hour of heating and agitation, 50 ml of hot water is added to the mixture which is then heated to boiling and filtered hot. Upon cooling the filtrate, a light-brown crystalline material precipitates. After separation of the precipitate, the aqueous portion of the filtrate is treated with 25 gms of solid sodium chloride to precipitate additional light brown crystalline material, which is combined with the first precipitate and washed with 15 to 20 ml of 10 percent sodium chloride solution. The washed material is dried to give 3.40 gms of 2,6-dimethylhydroquinone, melting point 149° to 152° C. Another 0.6 gm of melting point 148° to 151° C is obtained by extracting the filtrate with 250 ml of ether. Total yield is therefore 4.0 gms (87.3 percent theory). Recrystallized from 150 ml of hot benzene, light brown crystals, melting point 150° to 152° C are obtained, which melting point is not depressed when mixed with an authentic sample of 2,6-dimethylhydroquinone.

EXAMPLE 4

To a 500 ml high pressure vessel is charged 1 gm (0.005 mole) of 2-phenyl-4-nitrosophenol (Scholten, supra), 0.03 gms of 1 percent platinum-on-carbon, and 250 ml of 0.1 N sulfuric acid. The vessel is purged with hydrogen gas, and charged additionally with hydrogen gas at 16 to 18 psi. The mixture is heated to 80° to 85° C. for 4.5 hours, during which time it is continually agitated on a conventional shaker apparatus. After 4.5 hours, the mixture is cooled in a beaker to circa 10° C and filtered to remove solid materials, and the filtrate extracted with two 250 ml portions of ether. The aqueous layer is neutralized with solid sodium bicarbonate. The combined ether extracts are washed with water and dried over anhydrous magnesium sulfate. The ether is evaporated to yield 0.6 gms light brown liquid. Upon standing, the liquid slowly crystallizes and the crystals are purified by extraction at reflux temperature with 300 ml of n-hexane and recrystallized from n-hexane to yield 0.5 gms (53 percent theory) of fluffy white needles identified (by melting point comparison with an authentic sample of 2-phenylhydroquinone) as 2-phenylhydroquinone melting point 101.5° to 102.5° C.

| Anal. Calc. for | $C_{12}H_{10}O_2$: | C,77.4, H,5.41 |
|---|---|---|
| | Found: | C,77.75, H,5.08 |

EXAMPLE 5

To a 250 ml pyrex pressure bottle is added 5 gms (0.0303) mole of 2,3,6-trimethyl-4-nitrosophenol, 0.15 gm of 1 percent platinum-on-carbon (Baker Chemical Co.), and 50 ml of 1.5 N sulfuric acid. The reaction vessel is attached to a low pressure Parr hydrogenator and charged with hydrogen gas at 20 psi. The mixture is heated between 80° to 85° C and after 2 hours an additional 0.15 gms of 1 percent platinum-on-carbon is added and the vessel walls washed with 10 ml water followed by 15 ml toluene. The reaction vessel is recharged with hydrogen at 20 psi and heated for about 1 additional hour at 70° to 85° C. The reaction mixture is then diluted with 150 ml water and steam distilled for 20 minutes. The non-steam volatile part is brought to boiling and filtered hot. The filtrate is cooled to yield a white crystalline solid. The solid, separated, and washed with ice water and dried weighs 3.0 gms. Another 0.7 g of white crystals was isolated by ether extraction of the filtrate giving a total yield of 3.7 gms (80 percent theory), identified by melting point comparison with an authentic sample, as 2,3,6-trimethylhydroquinone with a melting point of 170° to 172° C.

EXAMPLE 6

To 250 ml. of 0.1 N sulfuric acid is added 1 gm of 2-methyl-4-nitrosophenol (prepared by nitrosation of o-cresol following general method of Borsche et al. supra) and 0.05 gms of 1 percent platinum-on-carbon. The mixture is charged to the Parr low pressure catalytic apparatus of Example 1, which is purged with hydrogen gas and charged additionally with hydrogen gas at 16–17 psi. The mixture is heated between 80° to 85° C for about 2 hours, cooled and filtered to remove catalyst and residue. The filtrate is extracted with ether, washed with water and dried. The dried filtrate is evaporated to dryness and the residue is 0.55 gms (54 percent theory) of tan crystalline needles, identified (by melting point comparison with an authentic sample of 2-methylhydroquinone) as 2-methylhydroquinone with melting point 124° to 126° C. Recrystallization from benzene yields tan crystals, melting point 124° to 125° C.

We claim:

1. A process for preparing a substituted hydroquinone of the formula:

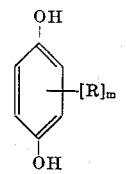

wherein R is a member selected from the group consisting of lower alkyl, aryl and lower-alkoxy and $m$ is an integer of 1 to 4; which process comprises heating the corresponding p-nitrosophenol to a temperature of about 60° to 120°C, in an 0.1 N to 6 N aqueous solution of a mineral acid selected from the group consisting of sulfuric, phosphoric and hydrochloric acid, and in the presence of hydrogen and from about 1 percent to about 5 percent by weight of said p-nitrosophenol, of a noble metal hydrogenation catalyst; the concentration of said p-nitrosophenol in said aqueous solution not exceeding about 100 gms. per liter.

2. The process of claim 1, wherein said hydrogenation catalyst is platinum supported on carbon.

3. The process of claim 1 wherein said mineral acid is sulfuric acid.

4. The process of claim 1 wherein said corresponding p-nitrosophenol is 2,6-dimethyl-4-nitrosophenol.

5. The process of claim 1 wherein said corresponding p-nitrosophenol is 2phenyl-4-nitrosophenol.

6. The process of claim 1 wherein said corresponding p-nitrosophenol is 2,3,6-trimethyl-4-nitrosophenol.

7. The process of claim 1 wherein said corresponding p-nitrosophenol is 2-methyl-4-nitrosophenol.

* * * * *